United States Patent
Mossoba et al.

(10) Patent No.: US 12,367,519 B2
(45) Date of Patent: Jul. 22, 2025

(54) METHOD, SYSTEM, AND NON-TRANSITORY COMPUTER READABLE STORAGE MEDIUM FOR A BROWSER EXTENSION FOR PRODUCT QUALITY

(71) Applicant: Capital One Services, LLC, McLean, VA (US)

(72) Inventors: Michael Mossoba, Great Falls, VA (US); Abdelkader M'Hamed Benkreira, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 83 days.

(21) Appl. No.: 17/530,183

(22) Filed: Nov. 18, 2021

(65) Prior Publication Data
US 2023/0153885 A1    May 18, 2023

(51) Int. Cl.
*G06Q 30/0601*    (2023.01)
*G06Q 30/012*    (2023.01)

(52) U.S. Cl.
CPC ....... *G06Q 30/0631* (2013.01); *G06Q 30/012* (2013.01)

(58) Field of Classification Search
CPC . G06Q 30/0601–0645; G06Q 30/0631; G06Q 30/012
USPC ............................................... 705/26.1–27.2
See application file for complete search history.

(56) References Cited

U.S. PATENT DOCUMENTS

| | | | |
|---|---|---|---|
| 7,082,426 B2 | 7/2006 | Musgrove et al. |
| 8,121,891 B2 | 2/2012 | Handel |
| 8,156,026 B2 | 4/2012 | Junger et al. |
| 8,442,844 B1 | 5/2013 | Trandal et al. |
| 9,384,345 B2 | 7/2016 | Dixon et al. |
| 9,535,930 B2 | 1/2017 | Westphal |
| 9,563,915 B2 | 2/2017 | Brady et al. |

(Continued)

FOREIGN PATENT DOCUMENTS

| | | |
|---|---|---|
| WO | 2002035421 | 5/2002 |
| WO | 2001022255 | 6/2002 |

OTHER PUBLICATIONS

Cheung, K., & Tian, L. F. (2004). Learning user similarity and rating style for collaborative recommendation. Information Retrieval, 7 (3-4), 395-410. Retrieved from https://dialog.proquest.com/professional/docview/230671899?accountid=131444 (Year: 2004).*

*Primary Examiner* — Jeffrey A. Smith
*Assistant Examiner* — Ashley D Preston
(74) *Attorney, Agent, or Firm* — Bookoff McAndrews, PLLC

(57) ABSTRACT

The innovation disclosed, in one aspect thereof, comprises systems and methods of a browser extension for product quality. Online shopping by a user can be monitored on a browser by a browser extension or integrated application with the browser. A potential purchase of a product is detected by the integrated application. The product is identified via analysis of a web page and cross reference to known products. The integrated application retrieves warranty claims data from an accessible warranty database. The warranty claims data is analyzed to determine a recommendation of the product. The integrated application presents the recommendation via the browser as an alert to the user.

15 Claims, 6 Drawing Sheets

(56) References Cited

U.S. PATENT DOCUMENTS

| | | |
|---|---|---|
| 10,424,000 B2 | 9/2019 | Chow |
| 2002/0087412 A1 | 7/2002 | Wood |
| 2002/0128859 A1 | 9/2002 | Perkowski |
| 2007/0250390 A1 | 10/2007 | Lee et al. |
| 2008/0065649 A1 | 3/2008 | Smiler |
| 2008/0120197 A1 | 5/2008 | Markowitz et al. |
| 2008/0288408 A1* | 11/2008 | Jacobsen ............ G06Q 30/0631 705/26.1 |
| 2010/0179857 A1* | 7/2010 | Kalaboukis .......... G06Q 20/208 705/26.1 |
| 2012/0095863 A1* | 4/2012 | Schiff ................ G06Q 30/0282 705/26.7 |
| 2014/0279868 A1 | 9/2014 | Astorg et al. |
| 2016/0104251 A1 | 4/2016 | Prakash et al. |
| 2016/0210602 A1* | 7/2016 | Siddique ................ G06T 17/00 |
| 2016/0275521 A1 | 9/2016 | Afshar et al. |
| 2017/0262815 A1* | 9/2017 | Shipman ............ G06Q 10/0875 |
| 2018/0300793 A1* | 10/2018 | Chen ................ G06Q 30/0631 |
| 2019/0213605 A1* | 7/2019 | Patel .................... G07C 5/0808 |
| 2019/0362403 A1 | 11/2019 | Chow |
| 2021/0217093 A1* | 7/2021 | Fani .................. G06Q 10/0635 |
| 2022/0405775 A1* | 12/2022 | Siebel ................ G06Q 30/0202 |

\* cited by examiner

METHOD, SYSTEM, AND NON-TRANSITORY COMPUTER READABLE STORAGE MEDIUM FOR A BROWSER EXTENSION FOR PRODUCT QUALITY

BACKGROUND

Typically, users purchase products online with little or no knowledge regarding quality, performance, maintenance, and/or the like of products. Usually, users make purchases based on cost alone. Users are not empowered with such knowledge to make informed decisions when purchasing the products. Users will often rely on customer reviews on a webpage of the product. However, such reviews have become increasingly unreliable due to false reviews, biased reviews, purchased reviews, untimely reviews, reviews that do not capture the life of the product, and/or the like. For example, reviews can be flawed because purchasers will review an item very early such as upon receiving the product. Therefore, the review does not actually capture the longevity or quality of the purchased item or product over time.

Web browser extensions are a popular mode to enhance experiences. Extensions for shopping typically involve providing cost insights regarding a product. For example, searching other retailers or webpages for the same product to perform a cost analysis such that the user can get the best price on the product. However, such extensions are only cost based and do not provide advice or recommendations based on quality of the product.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of a browser extension for product quality. Online shopping by a user can be monitored on a browser by a browser extension or integrated application with the browser. A potential purchase of a product is detected by the integrated application. The product is identified via analysis of a web page and cross reference to known products. The integrated application retrieves warranty claims data from an accessible warranty database. The warranty claims data is analyzed to determine a recommendation of the product. The integrated application presents the recommendation via the browser as an alert to the user.

In aspects, the subject innovation provides substantial benefits in terms of purchasing products online. One advantage resides in a more secure knowledge of the quality of the product. Another advantage resides in providing insights and recommendations based quality of a product and other product or user information.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents.

Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
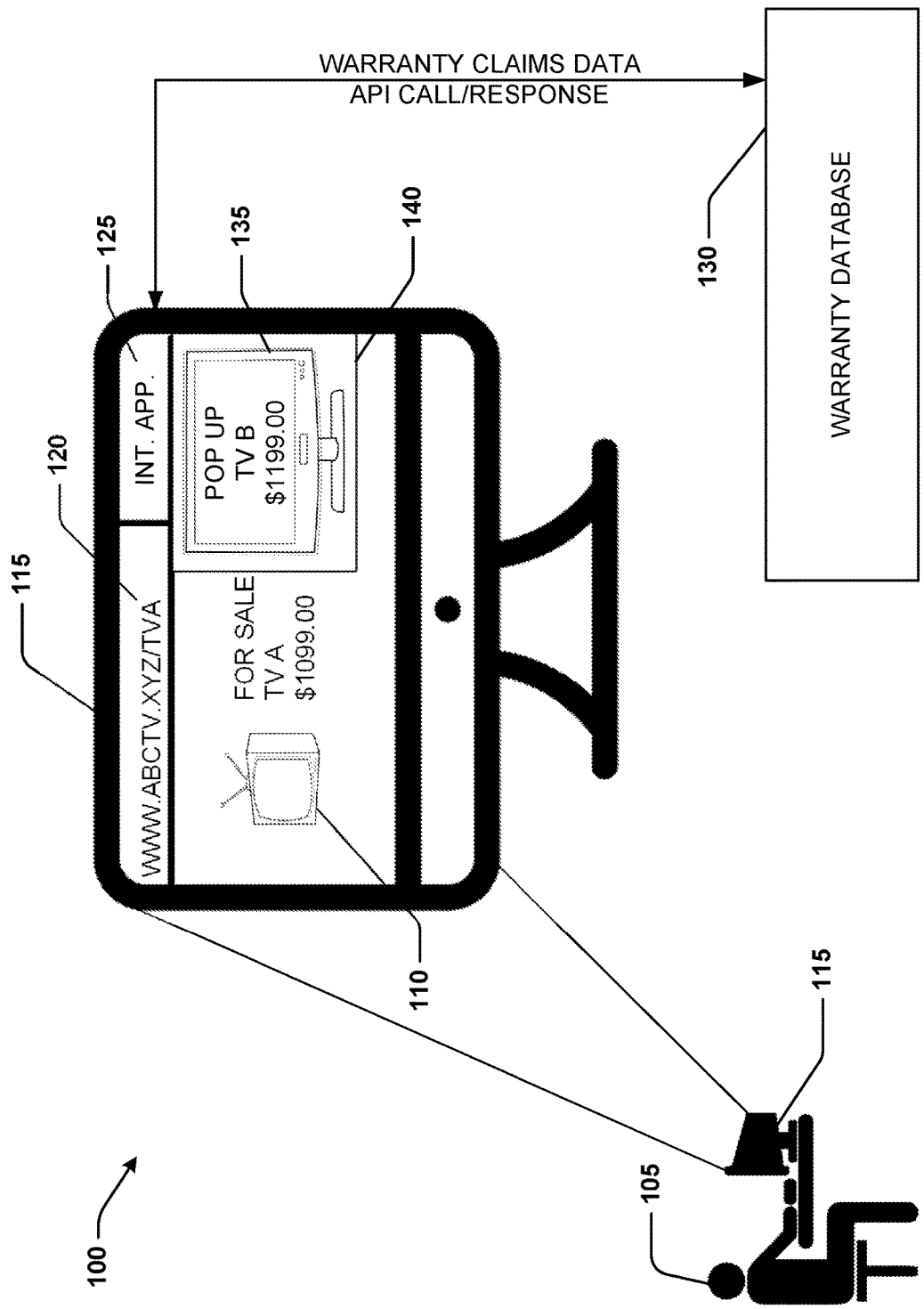
FIG. 1 illustrates a high level diagram of the subject innovation according to aspects herein.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are described, those skilled in the relevant art will recognize that various other alternatives can be employed. The terms "screen," "webpage," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

The innovation relates to browser extensions or integrated applications. An integrated application can detect online shopping and learn (and/or predict) what the user is shopping for. The integrated application can gather warranty data to assist in making a purchase decision. The integrated application can suggest alternate products for purchase based on analysis of the warranty data such that the user makes the best possible choice in products. In aspects, the recommendation can further be based on demographic data, machine learning based warranty and returns data, estimated budget, and/or the like.

While warranty data is used throughout, it is to be appreciated that most any product defect, failure or return is to be included within the spirit and/or scope of the innovation. For example, a pure warranty need not be triggered in order to appreciate the usefulness of the innovation. Rather, data representative of a mere return, swap or exchange of the product can be employed in alternative aspects and included within the spirit and/or scope of the innovation and claims appended hereto.

FIG. 1 illustrates a high level view of the subject innovation. A user 105 shops for a product 110 via a user device 115. The user device 115 can be a mobile phone, smart phone, tablet, personal computing device, wearable device, internet of things (IoT) device, kiosk, and/or the like. The user device 115 can include processors, storage, networking hardware, screens, user interfaces, displays, keyboard, pointing device, GPS (global positioning system), location tracking hardware/software, and/or the like.

The user device 115 can include applications, application instructions executed by processors, and/or the like. For example, the user device 115 can include a browser 120 or shopping application ('app') for accessing webpages for researching products, purchasing products, and/or the like. The browser 120 can communicate and/or interface with an integrated application 125. The integrated application 125 can be a browser extension or separate application on the user device 115 that integrates with the browser 120, the user device 115, and/or the like.

The integrated application 125 can monitor the browser 120 and/or shopping activity on the user device 115. The integrated application 125 can detect a potential purchase of a product by a user 105 via the user device 115. The integrated application 125 can activate upon a browser 120 being used for shopping. In some embodiments, the integrated application 125 can continuously monitor the browser 120 for shopping activities such as navigating to a retailer website, a review website, a shopping cart, and/or the like. In some embodiments, the integrated application 125 detects a potential purchase by identifying patterns on one or more webpages that can be accessed by the browser 120 via the user device 115. The integrated application 125 can match a present pattern of a webpage on the browser 120 to an identified pattern to determine the user 105 is considering a potential purchase.

Upon detecting a potential purchase, the integrated application 125 can identify or determine the product 110 that is being considered for purchase. The integrated application 125 can identify the product 110 by analyzing the browser 120 and/or the webpage that the browser 120 is accessing. In some embodiments, the integrated application 125 can utilize natural language processing (NLP) techniques to read the text on the webpage to detect a product name, model number, stock-keeping unit (SKU), barcode, Universal Product Code (UPC), product identifier, and/or the like. In other embodiments, the integrated application 125 can employ image matching techniques with image data on the webpage presented by the browser 120 to match to a known image or unique markings of the product 110, and/or the like. The integrated application 125 can access a product database to confirm a product identification with extracted information from the webpage presented by the browser 120.

Upon detecting the potential purchase and identifying the product 110, the integrated application 125 can access a warranty database 130. The integrated application 125 interfaces with the warranty database 130 to retrieve warranty claims data. The warranty claims data are related or associated with the product 110. The warranty claims data is compiled when a warranty claim is submitted for any particular product. The warranty claim is stored in the warranty database 130 and can be called via an application programming interface (API) call by the integrated application 125.

The integrated application 125 analyzes the warranty claims data received from the warranty database 130. The integrated application 125 analyzes the warranty claims data to determine a quality recommendation regarding the product 110. In some embodiments, the integrated application 125 generates a quality score and/or other metrics based on the analysis. In some embodiments, the analysis can include analyzing the number of claims made on the product 110, frequency of claims, increase/decrease in rate of claims over a time period, and/or the like. In other embodiments, further data sources can be analyzed such as location, durability, recall data, returns data, replacement data, service data, troubleshooting data, call center data, and/or the like. In some embodiments, the quality score and/or metrics is an aggregate of two or more data source analyses.

The integrated application 125 can generate a recommendation regarding the product 110. In some embodiments, the recommendation is one of "purchase the product 110," "do not purchase the product 110," or "purchase an alternate product 110." In some embodiments, the integrated application 125 can determine a recommendation to purchase or not purchase based on the quality score and/or other metrics compared to a threshold score. In this embodiment, if the recommendation is "do not purchase," the integrated application 125 can recommend a second product 135. The second product 135 can be an alternative or equivalent of the product 110. The second product 135 can be determined by having a quality score and/or metrics that satisfy the threshold score.

In some embodiments, the recommendation of the second product 135 can be based on a recommendation model. The recommendation model is trained via a machine learning technique using a set of warranty claims data and/or previous purchases. The recommendation model can be trained via purchase data or transaction data of a set of customers that are similar to the user 105. The similarity can be based on demographics, income, location, and/or the like. In some embodiments, the set of customers can be determined by comparing a similarity score of each customer to a similarity score of the user 105.

The integrated application 125 presents the recommendation to the user 105. In some embodiments, the integrated application 125 presents the recommendation to the user 105 as an alert 140 before purchase of the product 110. The alert 140 can be presented as a pop up window, a browser or webpage redirect, information overlay, and/or the like to present the recommendation. In some embodiments, the integrated application 125 can alter webpage code to inactivate or hide a purchase button that would purchase the product 110 for the user 105.

Figure 2:
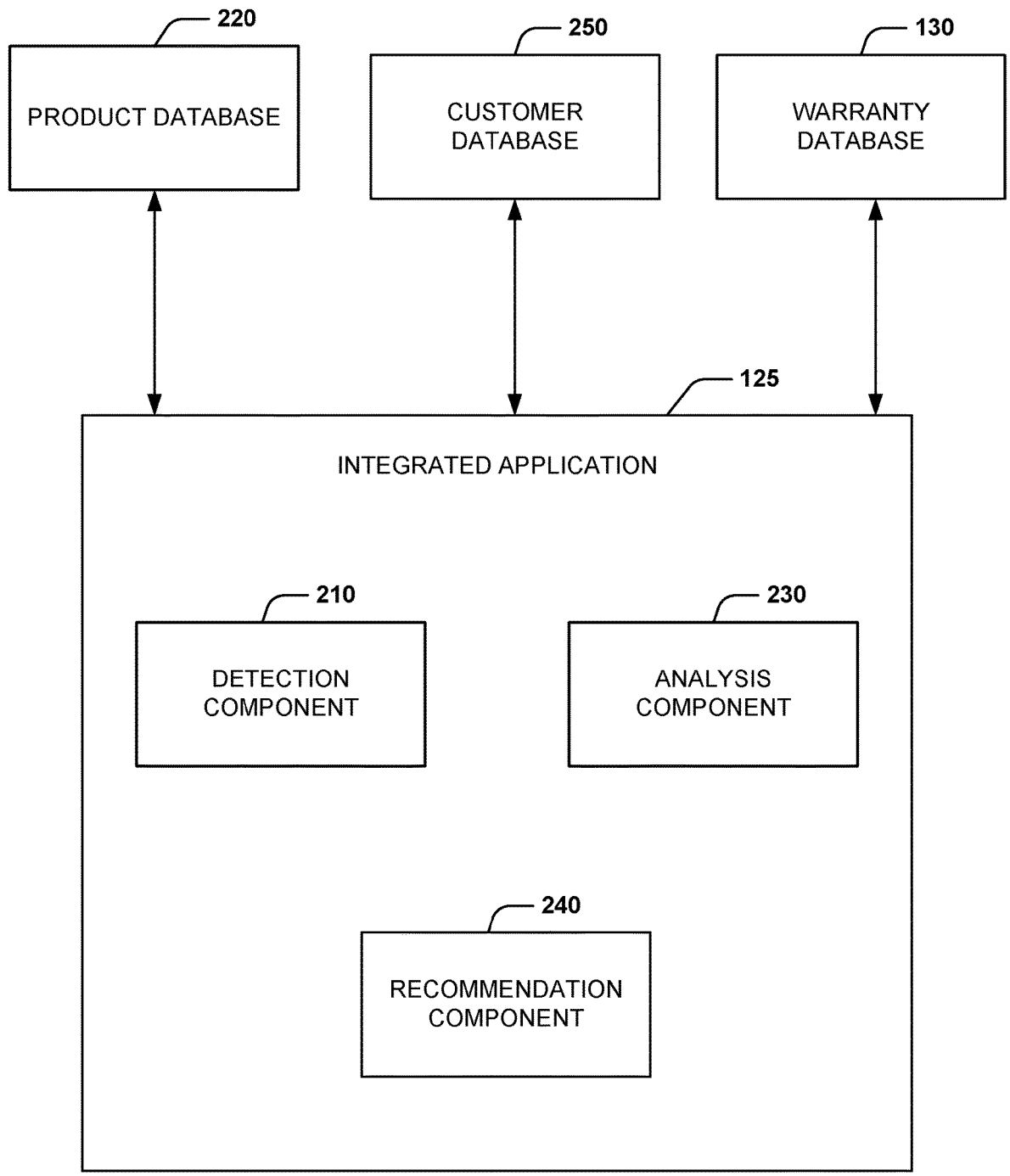
FIG. 2 illustrates an example component diagram of an integrated application.

FIG. 2 illustrates a detailed component diagram of the integrated application 125. The integrated application 125 empowers a user 105 to make decisions that are not strictly based on cost. The integrated application 125 provides insights regarding quality of a product 110. For example, the integrated application 125 can provide analysis such as determining a trend that a product 110 is purchased or replaced every two years at a cost of $100 while alternatively a second product 135 is purchased or replaced every three years at a cost of $120. The integrated application 125 can recommend the second product 135 as a long term cost savings recommendation due to the determined better quality and cost savings (e.g. replacement at three years instead of two years) of the second product 135.

The integrated application 125 can be a browser extension or application residing on the user device 115 that integrates with the browser 120, the user device 115, and/or the like. The integrated application 125 includes a detection component 210. The detection component 210 can monitor the browser 120 and/or shopping activity on the user device 115. The detection component 210 can detect a potential purchase of a product by a user 105 via the user device 115. The detection component 210 can activate upon a browser 120 being used for shopping. In some embodiments, the detection component 210 can continuously monitor the browser 120 for shopping activities such as navigating to a retailer website, a review website, a shopping cart, and/or the like. In some embodiments, the detection component 210 detects a potential purchase by identifying patterns on one or more webpages that can be accessed by the browser 120 via the user device 115. The detection component 210 can match a present pattern of a webpage on the browser 120 to an identified pattern to determine the user 105 is considering a potential purchase.

The detection component 210 can recognize webpages as the user 105 navigates the internet via the browser 120 and continuously determines the likelihood that the webpages belong to a shopping related website. For example, the detection component 210 can detect a shopping related website based off of natural language processing (NLP), word density, uniform resource locator (URL), and and/or other metrics. In some embodiments, the detection component 210 can determine a shopping related website that is not selling the product 110. For example, a valuation website to determine pricing (e.g. a blue book), a consumer report website, and/or the like.

The detection component 210 can identify the product 110 that is being considered for purchase from the webpage or website. For example, the detection component 210 can determine a make and a model of the product 110. In some embodiments, the detection component 210 can determine patterns for webpages. The detection component 210 can identify the patterns within any specific webpages to determine what is presented via the webpage and where different data elements are presented. For example, the detection component 210 can search for specific tags on the webpage and utilize business rules about where data is presented within the webpage (e.g. determining an expat variable of a webpage).

In other embodiments, the detection component 210 utilizes natural language processing (NLP) and/or word density to identify the product 110. In some embodiments, a combination of machine learning and NLP can be used to identify which part of a webpage is likely to be presenting the product 110. For example, the detection component 210 can recognize a partial picture and/or the like. The detection component can recognize a text string on the webpage that appears to be a product number because of phrasing, a key, or a string of characters.

The detection component 210 can cross reference or match an identification of the product 110 with a product database 220. The product database 220 can be identification data of a plurality of products such as images, SKU, UPC, barcode, make and model numbers, unique markings, and/or the like. In some embodiments, the detection component 210 can determine the product 110 through context of the webpage if there are multiple products in the product database 220 that match an identification.

The integrated application 125 includes an analysis component 230. Upon detecting the potential purchase and identifying the product 110, the analysis component 230 can access a warranty database 130. In some embodiments, the analysis component 230 interfaces with the warranty database 130 to retrieve warranty claims data. The warranty claims data are related or associated with the product 110. The warranty claims data is compiled when a warranty claim is submitted for any particular product. The warranty claim is stored in the warranty database 130 and can be called via an application programming interface (API) call/response by the integrated application 125. In some embodiments, the analysis component 230 can monitor transactions and refunds or warranty claims made by the user 105 via the browser 120. The analysis component 230 can capture the data to build the database based on the captured data.

In some embodiments, the warranty database 130 can be a third party data source, a machine learning built database over time, a government entity, a recall database, and/or the like. For example, a financial institution can monitor transaction data such as returns, refunds, and/or the like. The financial institution can build a database based on the transaction data matched to a purchase of a product 110 via machine learning and/or the like. The data can include data from the customers that validated the returns, refunds, receipt data, warranty claims, and/or the like. In some embodiments, the analysis component 230 can capture transaction data from users via email parsing for receipts and/or the like. The database can be accessed by the analysis component 230 to generate a recommendation to the user 105 about the product 110.

The analysis component 230 analyzes the warranty claims data received from the warranty database 130 and/or other data related to the product 110. The analysis component 230 analyzes the warranty claims data to determine a quality recommendation regarding the product 110. In some embodiments, the analysis component 230 generates a quality score and/or other metrics based on the analysis. The analysis can include analyzing the number of claims made on the product 110, frequency of claims, increase/decrease in rate of claims over a time period, location, durability, recall data, returns data, replacement data, service data, troubleshooting data, call center data, and/or the like. In some embodiments, the quality score and/or metrics is an aggregate or average of analyses of each data source.

In some embodiments, the analysis component 230 can make inferences based on transaction data based on business rules. For example, the detection component 210 can detect multiple purchases of a product 110 by a user 105 which would imply that an additional product was ordered. The analysis component 230 can rebut the implication by matching a return transaction that is in a user's transaction history. The analysis component 230 can price match a product to match a return transaction of the price to confirm a return and infer a replacement was ordered as opposed to an additional product being ordered.

The integrated application 125 includes a recommendation component 240. The recommendation component 240 can generate a recommendation regarding the product 110. In some embodiments, the recommendation is one of "purchase the product 110," "do not purchase the product 110," or "purchase an alternate product 110." The recommendation component 240 can determine a recommendation to purchase or not purchase based on a quality score and/or other metrics compared to a threshold score.

In some embodiments, the recommendation component 240 can generate the recommendation via a recommendation model. If the recommendation is "do not purchase," the integrated application 125 can recommend a second product 135. The second product 135 can be an alternative or equivalent of the product 110. The second product 135 can be determined by having a quality score and/or metrics that satisfy the threshold score.

In some embodiments, the recommendation model is trained via a machine learning technique using a set of warranty claims data and/or previous purchases. The recommendation model can be trained via purchase data or transaction data of a set of customers that are similar to the user 105. The similarity can be based on demographics, income, purchasing habits, location, and/or the like. In some embodiments, the set of customers can be determined by comparing a similarity score of each customer to a similarity score of the user 105. The recommendation component 240 can access a customer database 250. The customer database 250 can be, for example, associated with a financial institution that stores customer information. The customer information can be analyzed to generate a set of customers that are similar demographically to the user. The recommendation component 240 can determine the second product 135 using the set of similar customers. For example, the set of customers all have similar incomes as that of the user 105. The recommendation component 240 can determine the second product 135 as the product most commonly purchased by the set of customers that is different from the product 110 being considered for purchase. The recommendation component 240 can use the set of customers to make inferences on the trustworthiness of the warranty claim data. For example, certain customer segments may be more likely to generate a warranty claim than other customer segments.

In some embodiments, the recommendation component 240 presents the recommendation to the user 105 as an alert 140 before purchase of the product 110. The alert 140 can be presented as a pop up window, a browser or webpage redirect, information overlay, and/or the like to present the purchase recommendation. In some embodiments, the recommendation component 240 can alter the webpage code to inactivate or hide a purchase button that would purchase the product 110 for the user 105.

Figure 3:
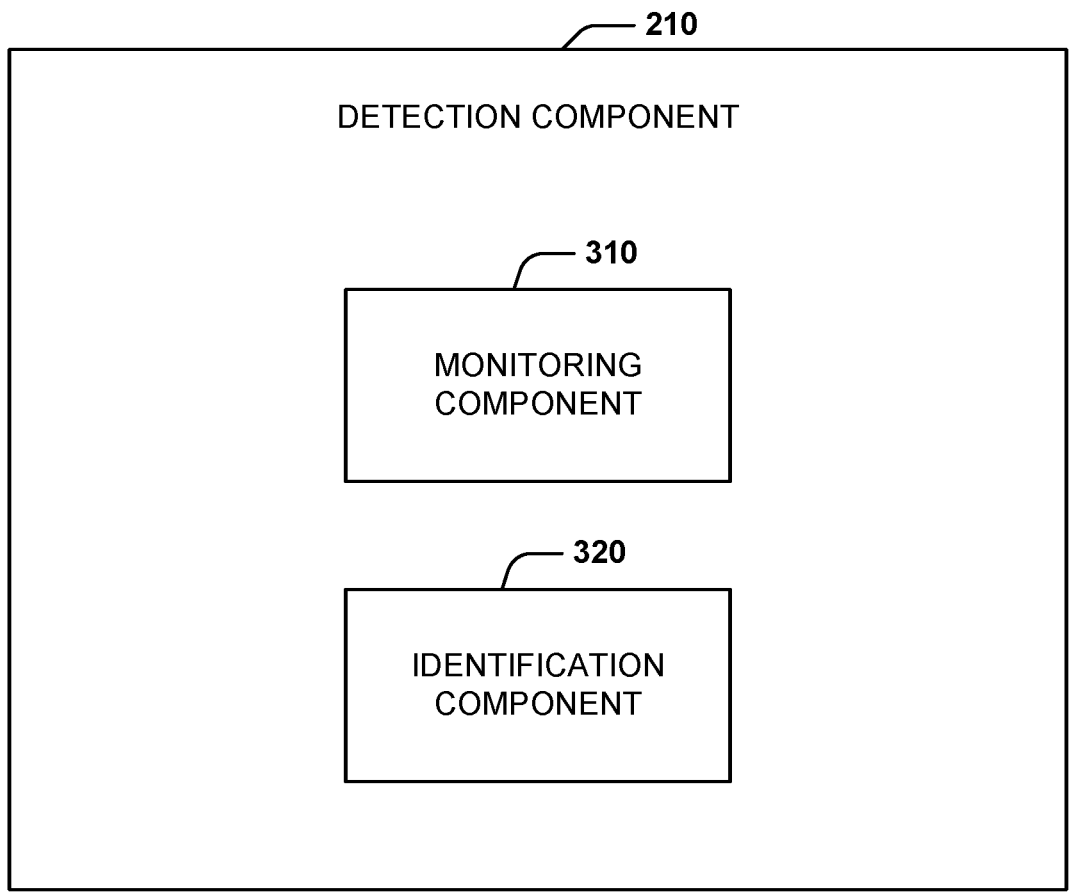
FIG. 3 illustrates an example component diagram of a detection component.

FIG. 3 illustrates a component diagram of the detection component 210. The detection component 210 includes a monitoring component 310. The monitoring component 310 can monitor the browser 120 and/or shopping activity on the user device 115. The monitoring component 310 can detect a potential purchase of a product by a user 105 via the user device 115. The monitoring component 310 can activate upon a browser 120 being used for shopping. In some embodiments, the monitoring component 310 can continuously monitor the browser 120 for shopping activities such as navigating to a retailer website, a review website, a shopping cart, and/or the like. In some embodiments, the monitoring component 310 detects a potential purchase by identifying patterns on one or more websites that can be accessed by the browser 120 via the user device 115. The monitoring component 310 can match a present pattern of a webpage on the browser 120 to an identified pattern to determine the user 105 is considering a potential purchase.

The monitoring component 310 can recognize webpages as the user 105 navigates the internet via the browser 120 and makes continuous determinations of the likelihood that the webpage(s) are a shopping related website. For example, the detection component 210 can detect a shopping related website based off of natural language processing (NLP), word density, and and/or other metrics. In some embodiments, the monitoring component 310 can determine a shopping related website that is not selling the product 110. For example, a valuation website to determine pricing (e.g. a blue book), a consumer report website, and/or the like.

The detection component 210 includes an identification component 320. The identification component 320 can identify the product 110 that is being considered for purchase from the webpage or website. For example, the identification component 320 can determine a make and a model of the product 110. In some embodiments, the identification component 320 can determine patterns for webpages. The identification component 320 can identify the patterns within any specific webpages to determine what is presented via the webpage and where different data elements are presented. For example, the identification component 320 can search for specific tags on the webpage and utilize business rules about where data is presented within the webpage (e.g. determining an expat variable of a webpage).

In other embodiments, the identification component 320 utilizes natural language processing (NLP) and/or word density to identify the product 110. In some embodiments, a combination of machine learning and NLP can be used to identify which part of a website or webpage is likely to be presenting the product 110. For example, the identification component 320 can recognize a partial picture and/or the like. The identification component 320 can recognize a text string on the webpage that appears to be a product number because of phrasing, a key, or a string of characters.

The identification component 320 can cross reference or match an identification of the product 110 with a product database 220. The product database 220 can be identification data of a plurality of products such as images, SKU, UPC, barcode, make and model numbers, unique markings, and/or the like. In some embodiments, the identification component 320 can determine the product 110 through context of the webpage if there are more than one products in the product database 220 that match the identification.

Figure 4:
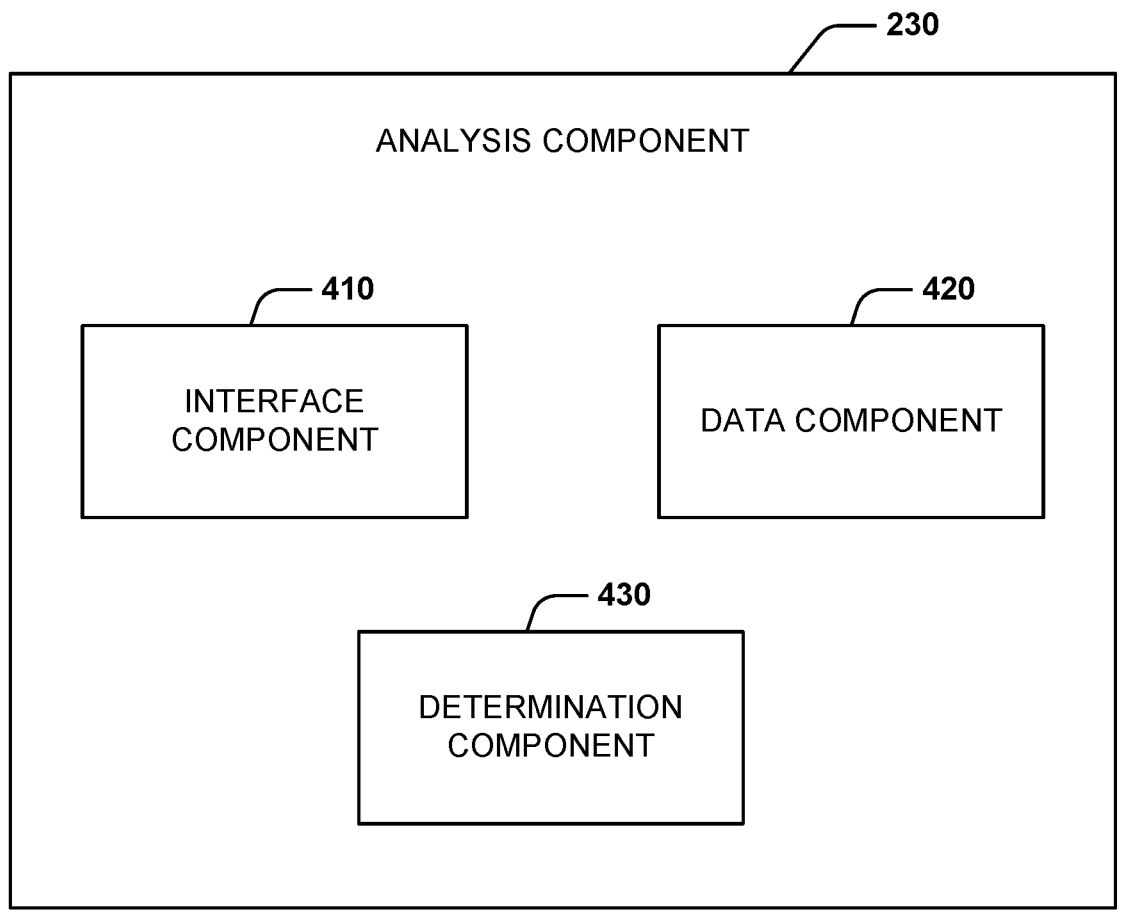
FIG. 4 illustrates an example component diagram of an analysis component.

FIG. 4 illustrates a component diagram of an analysis component 230. The analysis component 230 includes an interface component 410. Upon detecting the potential purchase and identifying the product 110, the interface component 410 can access a warranty database 130. In some embodiments, the interface component 410 interfaces with the warranty database 130 to retrieve warranty claims data. The warranty claims data are related or associated with the product 110. The warranty claims data is compiled when a warranty claim is submitted for any particular product. The warranty claim is stored in the warranty database 130 and can be called via an application programming interface (API) call/response by the interface component 410. In some embodiments, the interface component 410 can monitor transactions and refunds or warranty claims made by the user 105 via the browser 120. The interface component 410 can capture the data to build the database based on the captured data.

In some embodiments the analysis component 240 includes a data component 420. The data component 420 can access a third party data sources, build a machine learning database over time, a government entity database, a recall database, and/or the like. For example, the data component 420 can monitor transaction data such as returns, refunds, and/or the like. The data component 420 builds a database based on the transaction data matched to a purchase of a product 110 via machine learning and/or the like. The data can include data from the customers that validated the returns, refunds, receipt data, warranty claims, and/or the like. In some embodiments, the data component 420 can capture transaction data from users via email parsing for receipts and/or the like. The database can be accessed by the data component 420 to generate a recommendation to the user 105 about the product 110.

The analysis component 230 includes a determination component 430. The determination component 430 analyzes the warranty claims data received from the warranty database 130 and/or other data related to the product 110. The determination component 430 analyzes the warranty claims data to determine a quality recommendation regarding the product 110. In some embodiments, the determination component 430 generates a quality score and/or other metrics based on the analysis. The analysis can include analyzing the number of claims made on the product 110, frequency of claims, increase/decrease in rate of claims over a time period, location, durability, recall data, returns data, replacement data, service data, troubleshooting data, call center data, and/or the like. In some embodiments, the quality score and/or metrics is an aggregate or average of each analysis of a data source about the product 110 in the warranty claims data.

In some embodiments, the determination component 430 can make inferences based on transaction data based on business rules. For example, multiple purchases of a product 110 by a user 105 would imply that an additional product was ordered instead of a return. The determination component 430 can confirm the implication by attempting to match a return transaction that in a user's transaction history. The determination component 430 can attempt to price match a product to match a return transaction of the price to confirm a return. If a price match is not found, the determination component 430 can confirm that inference that an additional product was ordered. In some embodiments, the determination component 430 factors time, user 105 information, and/or the like to determine a recommendation. For example, the determination component 430 can factor a television purchased in 2014, and another television purchased in 2020. The determination component 430 can utilize user information such as a change in address to facilitate determining whether the second television was a replacement or an addition to the first television. In some embodiments, the determination component 430 can compare the two products to determine whether it is a replacement scenario. For example, the determination component 430 can compare sizes of the televisions to determine a replacement, e.g. a 20 inch television is unlikely to be replacing a 60 in television. The determination component 430 can use previous purchase history to build a model using machine learning techniques to determine the likelihood a product 110 had to be replaced.

Figure 5:
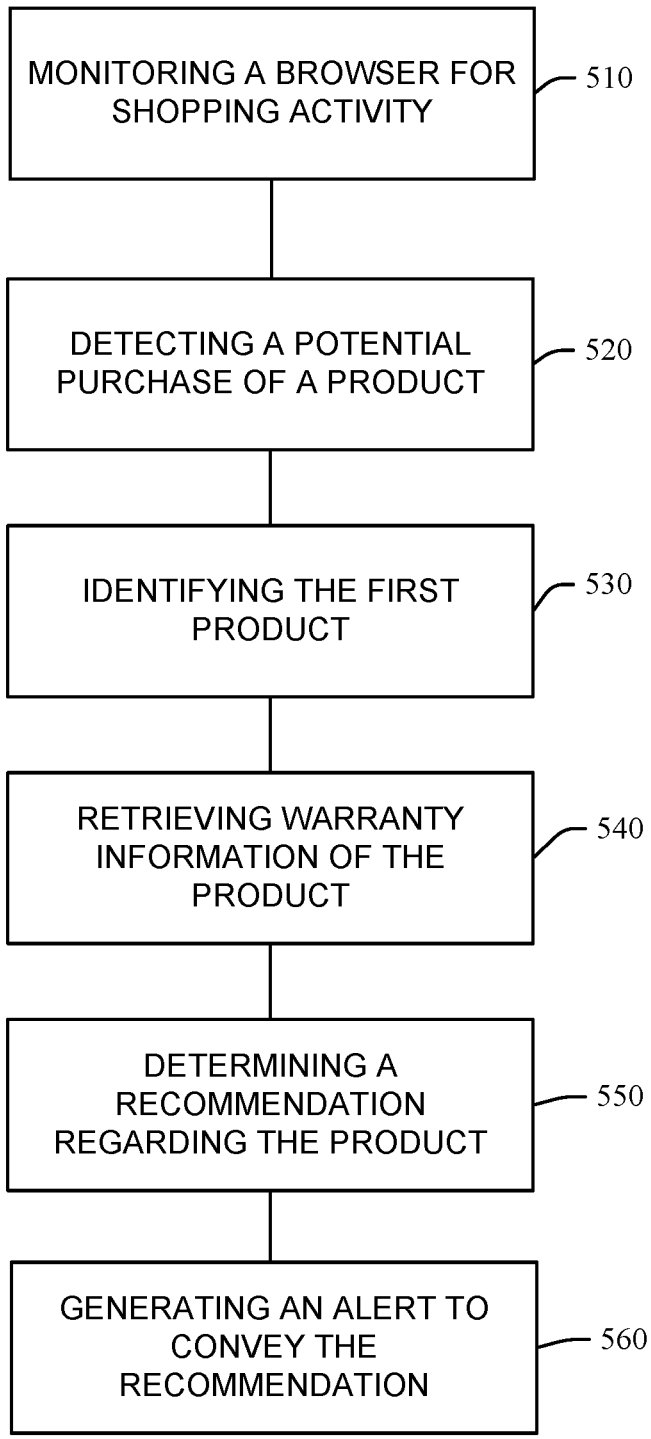
FIG. 5 illustrates a method for a browser extension for product quality in accordance with aspects herein.

With reference to FIG. 5, example method 500 is depicted for product quality recommendations. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 500 are described in conjunction with a specific example is for explanation purposes.

FIG. 5 illustrates a method 500 for a browser extension for product quality. At 510, a browser is monitored for shopping activity. The browser 120 is employed by a user 105 via a user device 115. The browser 120 is monitored by an integrated application 125. At 520, a potential purchase of a product 110 via the browser 120 is detected by the integrated application 125. The integrated application 125 can determine a potential purchase through analyzing the activity on the browser. For example, accessing a shopping webpage or product review page. At 530, the product 110 is identified. The product can be identified via analysis of the webpage by the integrated application 125.

At 540, warranty information of the product 110 is retrieved. The integrated application 125 can interface with a warranty database that has compiled warranty claims data of the product 110. At 550, a recommendation regarding the product 110 is determined. The integrated application 125 analyzes the warranty claims data to determine a quality of the product which results in a recommendation of whether to purchase the product 110, do not purchase the product 110, and/or recommend an alternate product 110. For example, if the warranty claims data reveals that 20% of the product 110 that was sold resulted in a warranty claim, the integrated application 125 can recommend that the user 105 does not purchase the product 110. At 560, an alert of the recommendation is generated. The integrated application 125 can generate the alert as a pop up window overlaid on the browser, an email, text message, browser redirect, deactivating purchase functions of the webpage, and/or the like.

The innovation disclosed and claimed herein, in one aspect thereof, comprises systems and methods of product quality recommendations. A method includes detecting a potential purchase of a product by a user, wherein the potential purchase is conducted via a user device; retrieving warranty claims data of the product from a warranty database; and presenting, via the user device, a purchase recommendation regarding the product based on the warranty claims data.

A system of the innovation can include a processor coupled to a memory storing instructions that are executed by the processor. The instructions comprise identifying a product that a user may purchase using a user device; retrieving warranty claims data of the product from a warranty database; and blocking, via the user device, the purchase of the product based on the warranty claims data.

A computer readable medium having instructions to control one or more processors configured to: detect a product being considered for purchase via a user device; activate an integrated application on the device based on the detection; retrieve warranty claims data of the product being considered for purchase from a warranty database; analyze a subset of the warranty claims data to establish a purchase recommendation regarding the product; and present, via the online device, the purchase recommendation regarding the product based on the analysis, wherein the purchase recommendation is one of purchase the product, do not purchase the product, or purchase an alternate product.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
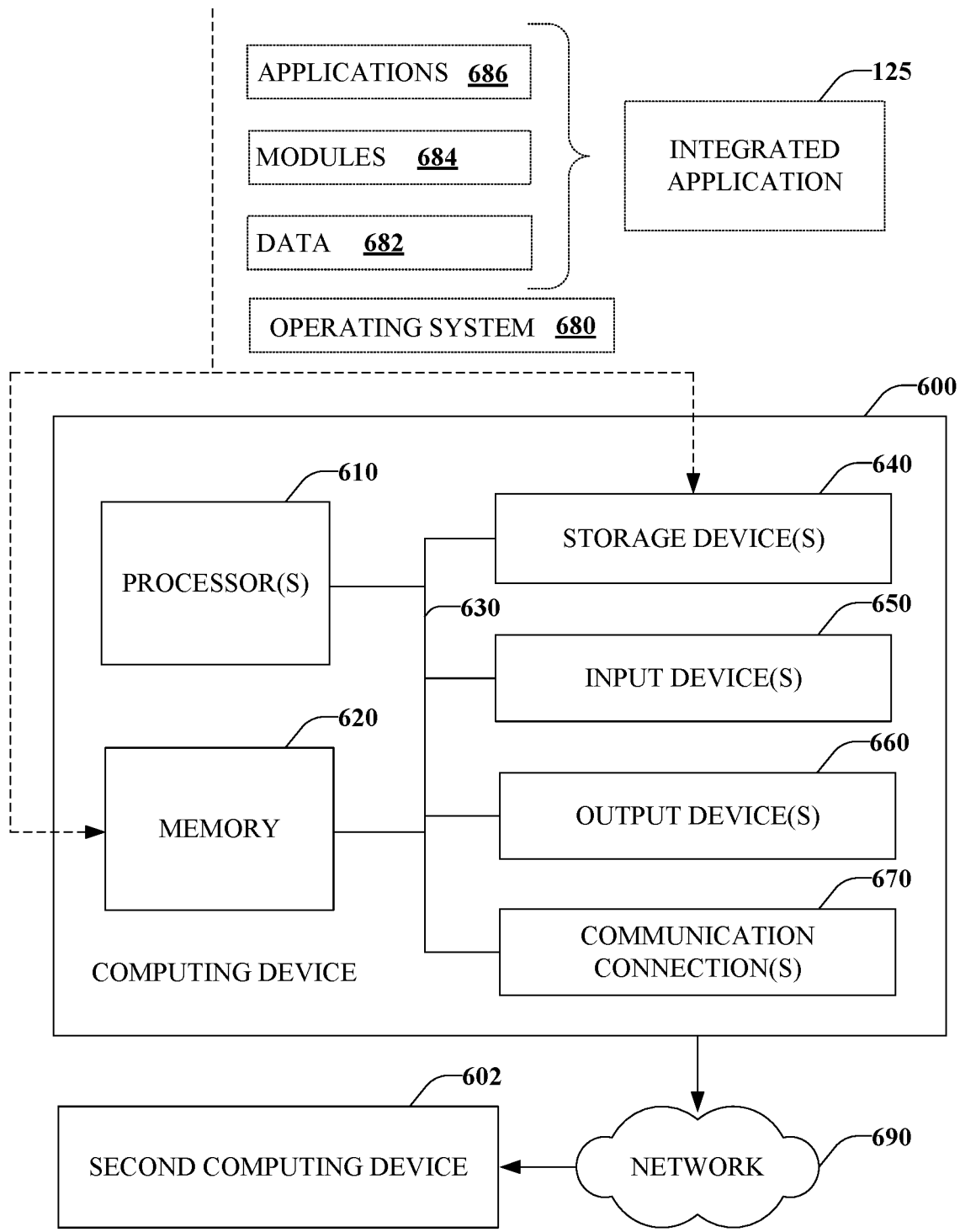
FIG. 6 illustrates a computing environment where one or more of the provisions set forth herein can be implemented, according to some embodiments

To provide a context for the disclosed subject matter, FIG. 6 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 6, illustrated is an example computing device 600 (e.g., desktop, laptop, tablet, watch, server, hand-held, programmable consumer or industrial electronics, set-top box, game system, compute node . . . ). The computing device 600 includes one or more processor(s) 610, memory 620, system bus 630, storage device(s) 640, input device(s) 650, output device(s) 660, and communications connection(s) 670. The system bus 630 communicatively couples at least the above system constituents. However, the computing device 600, in its simplest form, can include one or more processors 610 coupled to memory 620, wherein the one or more processors 610 execute various computer executable actions, instructions, and or components stored in the memory 620.

The processor(s) 610 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 610 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 610 can be a graphics processor unit (GPU) that performs calculations with respect to digital image processing and computer graphics.

The computing device 600 can include or otherwise interact with a variety of computer-readable media to facilitate control of the computing device to implement one or more aspects of the disclosed subject matter. The computer-readable media can be any available media that accessible to the computing device 600 and includes volatile and non-volatile media, and removable and non-removable media. Computer-readable media can comprise two distinct and mutually exclusive types, namely storage media and communication media.

Storage media includes volatile and nonvolatile, removable, and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 600. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 620 and storage device(s) 640 are examples of computer-readable storage media. Depending on the configuration and type of computing device, the memory 620 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 600, such as during start-up, can be stored in nonvolatile memory, while volatile memory can act as external cache memory to facilitate processing by the processor(s) 610, among other things.

The storage device(s) 640 include removable/non-removable, volatile/non-volatile storage media for storage of vast amounts of data relative to the memory 620. For example, storage device(s) 640 include, but are not limited to, one or more devices such as a magnetic or optical disk drive, floppy disk drive, flash memory, solid-state drive, or memory stick.

Memory 820 and storage device(s) 640 can include, or have stored therein, operating system 680, one or more applications 686, one or more program modules 684, and data 682. The operating system 680 acts to control and allocate resources of the computing device 600. Applications 686 include one or both of system and application software and can exploit management of resources by the operating system 680 through program modules 684 and data 682 stored in the memory 620 and/or storage device(s) 640 to perform one or more actions. Accordingly, applications 686 can turn a general-purpose computer 600 into a specialized machine in accordance with the logic provided thereby.

All or portions of the disclosed subject matter can be implemented using standard programming and/or engineering techniques to produce software, firmware, hardware, or any combination thereof to control the computing device 600 to realize the disclosed functionality. By way of example and not limitation, all or portions of the integrated application 125 can be, or form part of, the application 686, and include one or more modules 684 and data 682 stored in memory and/or storage device(s) 640 whose functionality can be realized when executed by one or more processor(s) 610.

In accordance with one particular embodiment, the processor(s) 610 can correspond to a system on a chip (SOC) or like architecture including, or in other words integrating, both hardware and software on a single integrated circuit substrate. Here, the processor(s) 610 can include one or more processors as well as memory at least similar to the processor(s) 610 and memory 620, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the integrated application 125 and/or functionality associated therewith can be embedded within hardware in a SOC architecture.

The input device(s) 650 and output device(s) 660 can be communicatively coupled to the computing device 600. By way of example, the input device(s) 650 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 660, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 650 and output device(s) 660 can be connected to the computing device 600 by way of wired connection (e.g., bus), wireless connection (e.g., Wi-Fi, Bluetooth . . . ), or a combination thereof.

The computing device 600 can also include communication connection(s) 670 to enable communication with at least a second computing device 602 by means of a network 690. The communication connection(s) 670 can include wired or wireless communication mechanisms to support network communication. The network 690 can correspond to a local area network (LAN) or a wide area network (WAN) such as the Internet. The second computing device 602 can be another processor-based device with which the computing device 600 can interact. For example, the computing device 600 can correspond to a server that executes functionality of the integrated application 125, and the second computing device 602 can be a user device that communications and interacts with the computing device 600.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
    activating an integrated application, wherein the integrated application is integrated with a browser of a user device;
    detecting, by the integrated application, a potential purchase of a first product by a user, wherein the potential purchase is conducted via the user device;
    retrieving, by the integrated application, warranty claims data of the first product from a warranty database, wherein the integrated application is configured to interface with the warranty database;
    determining, by the integrated application, a set of customers which are similar to the user by comparing a similarity score of one or more prior customers against a similarity score of the user;
    transmitting, by the integrated application, instructions for modifying a machine-learning model using transaction data of the set of customers which are similar to the user, thereby producing a modified machine-learning model;
    causing analysis, by the integrated application, via the modified machine-learning model, of a subset of the warranty claims data to determine a purchase recommendation regarding the first product,
    wherein the purchase recommendation includes:
        a recommendation to purchase a second product other than the first product, and
        a recommendation not to purchase the first product;

blocking, by the integrated application, via the user device and prior to the purchase of the first product, the purchase of the first product based on an output of the modified machine-learning model;
altering a webpage presented on the user device by inactivating a portion of the webpage such that a purchase of the first product cannot be completed; and
causing to output, via a graphical user interface, the altered webpage.

2. The method of claim 1, the analysis comprising:
generating the recommendation via the modified machine-learning model.

3. The method of claim 2, further comprising:
wherein the machine-learning model is trained using data associated with a set of customers that exceed a similarity score threshold with the user.

4. The method of claim 3,
wherein the second product is determined via the modified machine-learning model with returns data and transaction data of the set of customers.

5. The method of claim 1, the detecting comprising:
identifying patterns on one or more webpages that can be accessed by the user device; and
detecting a present pattern matches an identified pattern to determine a potential purchase.

6. The method of claim 1, further comprising:
generating a pop-up webpage window, a browser redirect, or information overlay to present the purchase recommendation.

7. A system, comprising:
a memory storing processor readable instructions; and
at least one processor configured to access the memory and execute the processor readable instructions, which when executed by the at least one processor, configures the at least one processor to perform a plurality of functions, including functions for:
activating an integrated application, wherein the integrated application is integrated within a browser of a user device;
identifying, by the integrated application, a first product that a user may purchase using a user device;
retrieving, by the integrated application, warranty claims data of the first product from a warranty database, wherein the integrated application is configured to interface with the warranty database;
determining, by the integrated application, a set of customers which are similar to the user by comparing a similarity score of one or more prior customers against a similarity score of the user;
transmitting, by the integrated application, instructions for modifying a machine-learning model using transaction data of the set of customers which are similar to the user, thereby producing a modified machine-learning model;
causing analysis, by the integrated application, via the modified machine-learning model, of a subset of the warranty claims data to determine a purchase recommendation regarding the first product, wherein the recommendation includes a recommendation to purchase a second product other than the first product;
blocking, by the integrated application, via the user device and prior to the purchase of the first product, the purchase of the first product based on an output of the modified machine-learning model;
altering a webpage presented on the user device, the altering comprising inactivating a portion of the webpage such that a purchase of the first product cannot be completed; and
causing to output, via a graphical user interface, the altered webpage.

8. The system of claim 7,
wherein the integrated application:
monitors the browser for potential purchases; and
interfaces with the warranty database to retrieve the warranty claims data.

9. The system of claim 8, wherein the functions further include:
identifying patterns on one or more webpages that can be accessed by the user device; and
detecting a present pattern matches an identified pattern via the integrated application to determine a potential purchase.

10. The system of claim 7, wherein the analysis comprises:
training the machine-learning model via a machine learning technique using the transaction data of the set of customers which are similar to the user; and
generating the recommendation via the modified machine-learning model.

11. The system of claim 10,
wherein the machine-learning model has been trained using a set of customers that exceed a similarity score threshold with the user.

12. The system of claim 11,
wherein the second product is determined via the modified machine-learning model with returns data and transaction data of the set of customers.

13. The system of claim 7,
wherein the purchase recommendation further includes a recommendation to not purchase the first product.

14. A non-transitory computer readable storage medium storing instructions to control one or more processors to perform operations, including:
detecting a first product being considered for purchase via a user device;
activating an integrated application on the device based on the detection;
retrieving, by the integrated application, warranty claims data of the first product being considered for purchase from a warranty database, wherein the integrated application is configured to interface with the warranty database;
determining, by the integrated application, a set of customers which are similar to the user by comparing a similarity score of one or more prior customers against a similarity score of the user;
transmitting instructions, by the integrated application, for modifying a machine-learning model using transaction data of the set of customers which are similar to the user, thereby producing a modified machine-learning model;
causing analysis, by the integrated application, via the modified machine-learning model, of a subset of the warranty claims data to establish a purchase recommendation for purchasing the first product,
wherein the purchase recommendation includes:
a recommendation to purchase a second product other than the first product, and
a recommendation not to purchase the first product;
blocking, by the integrated application, via the user device and prior to the purchase of the first product, the purchase of the first product based on an output of the modified machine-learning model;

altering a webpage presented on the user device, the altering comprising inactivating a portion of the webpage such that a purchase of the first product cannot be completed; and causing to output, via a graphical user interface, the altered webpage.

15. The computer readable medium of claim 14, wherein the second product is determined via the modified machine-learning model with returns data and transaction data of a set of customers.

* * * * *